US012623692B2

(12) United States Patent
Elwinger

(10) Patent No.: US 12,623,692 B2
(45) Date of Patent: May 12, 2026

(54) EMERGENCY REPORT SYSTEM FOR AUTONOMOUS VEHICLES

(71) Applicant: Torc Robotics, Inc., Blacksburg, VA (US)

(72) Inventor: Carlo Elwinger, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 160 days.

(21) Appl. No.: 18/532,985

(22) Filed: Dec. 7, 2023

(65) Prior Publication Data

US 2025/0187632 A1    Jun. 12, 2025

(51) Int. Cl.
*B60W 60/00*        (2020.01)
*B60W 50/14*        (2020.01)
*H04W 4/90*         (2018.01)

(52) U.S. Cl.
CPC ...... *B60W 60/00182* (2020.02); *B60W 50/14* (2013.01); *B60W 60/00186* (2020.02); *B60W 2554/404* (2020.02); *B60W 2556/45* (2020.02); *H04W 4/90* (2018.02)

(58) Field of Classification Search
CPC combination set(s) only.
See application file for complete search history.

(56) References Cited

U.S. PATENT DOCUMENTS

| | | | |
|---|---|---|---|
| 5,475,750 A * | 12/1995 | McMonagle, Jr. ..... | H04M 1/18 |
| | | | 200/341 |
| 6,310,543 B1 | 10/2001 | Yoshioka et al. | |
| 8,712,367 B2 | 4/2014 | Staehlin et al. | |
| 9,333,912 B2 | 5/2016 | Tomita et al. | |
| 9,942,740 B2 | 4/2018 | Corley et al. | |
| 11,120,643 B2 | 9/2021 | Pohlenz | |
| 2020/0276973 A1 * | 9/2020 | Meijburg ......... | G08G 1/096816 |
| 2022/0038880 A1 * | 2/2022 | Nagasawa ............... | H04W 4/44 |
| 2022/0038881 A1 | 2/2022 | Nagasawa | |
| 2022/0103993 A1 | 3/2022 | Nagasawa | |
| 2022/0167139 A1 | 5/2022 | Dodman | |
| 2023/0025199 A1 | 1/2023 | Tsuge | |

* cited by examiner

*Primary Examiner* — Vivek D Koppikar
*Assistant Examiner* — Jeffrey R Chalhoub
(74) *Attorney, Agent, or Firm* — Armstrong Teasdale LLP

(57) ABSTRACT

The disclosed method for reporting an emergency on a roadway includes sensing, by an electronic control unit (ECU) of an autonomous vehicle, a perceived situation nearby the autonomous vehicle. The method includes determining, by the ECU, to perform an emergency stop of the autonomous vehicle when the perceived situation indicates an emergency situation. The method includes initiating an emergency stop of the autonomous vehicle. The method includes transmitting, by the ECU, an emergency report to at least one emergency service, the emergency report including autonomous vehicle information and emergency situation information.

18 Claims, 6 Drawing Sheets

EMERGENCY REPORT SYSTEM FOR AUTONOMOUS VEHICLES

TECHNICAL FIELD

The field of the disclosure relates generally to autonomous vehicles and, more specifically, to an emergency report system for autonomous vehicles.

BACKGROUND OF THE INVENTION

Truck cabs, vehicles, and public areas are often equipped with an emergency button or alarm for a driver or individual to press to contact emergency services when there is an emergency, danger, or crisis. Alternatively, if there is a life-threatening situation or danger arises, a driver or occupant of the vehicle, or a nearby individual may use a mobile telephone, or a telephone at an emergency manual or automatic call point, located along a roadway or in a building or structure, to initiate an alarm signal or to contact emergency services. These communication methods are sometimes implemented by transmitting global positioning system (GPS) data to summon for help or to alert people, or by using a wireless or wired connection to connect with an emergency services system operating on a communications network. In some emergency situations, however, individuals may not be able to locate the call point, or there are no vehicle occupants or nearby individuals with a communication device, or the communication device fails or is inaccessible.

Many vehicles are equipped with driver assistance technologies to help save lives in an emergency and prevent injuries on roadways. As automotive technology continues to evolve, there is a desire to deliver safety benefits through automated driving systems. For example, since some automated driving systems remove a human driver from events leading to an emergency, the National Highway Traffic Safety Administration requires manufacturers and operators of automated driving systems to report crashes.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed method for reporting an emergency on a roadway includes sensing, by an electronic control unit (ECU) of an autonomous vehicle, a perceived situation nearby the autonomous vehicle. The method includes determining, by the ECU, to perform an emergency stop of the autonomous vehicle when the perceived situation indicates an emergency situation. The method includes initiating an emergency stop of the autonomous vehicle. The method includes transmitting, by the ECU, an emergency report to at least one emergency service, the emergency report including autonomous vehicle information and emergency situation information.

In another aspect, the disclosed emergency reporting system includes an electronic control unit (ECU) comprising a memory storing executable instructions and at least one processor coupled to the memory and configured to gain access to and execute the executable instructions. The ECU includes a sensor evaluation unit configured to employ at least one sensor to sense a perceived situation nearby the autonomous vehicle. The ECU includes a behavior module configured to determine to perform an emergency stop of the autonomous vehicle when the perceived situation indicates an emergency situation and initiate the emergency stop. A communication subsystem is configured to transmit an emergency report to at least one emergency service, the emergency report including autonomous vehicle information and emergency situation information.

In yet another aspect, the disclosed autonomous vehicle includes a user interface, and an electronic control unit (ECU). The ECU includes a memory storing executable instructions and at least one processor coupled to the memory and configured to gain access to and execute the executable instructions. The ECU includes a sensor evaluation unit configured to employ at least one sensor to sense a perceived situation nearby the autonomous vehicle. The ECU includes a behavior module configured to determine to perform an emergency stop of the autonomous vehicle when the perceived situation indicates an emergency situation, and initiate the emergency stop. The ECU includes a communication subsystem communicatively coupled to a remote emergency report system, the communication subsystem configured to transmit an emergency report to at least one emergency service, the emergency report including autonomous vehicle information and emergency situation information.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
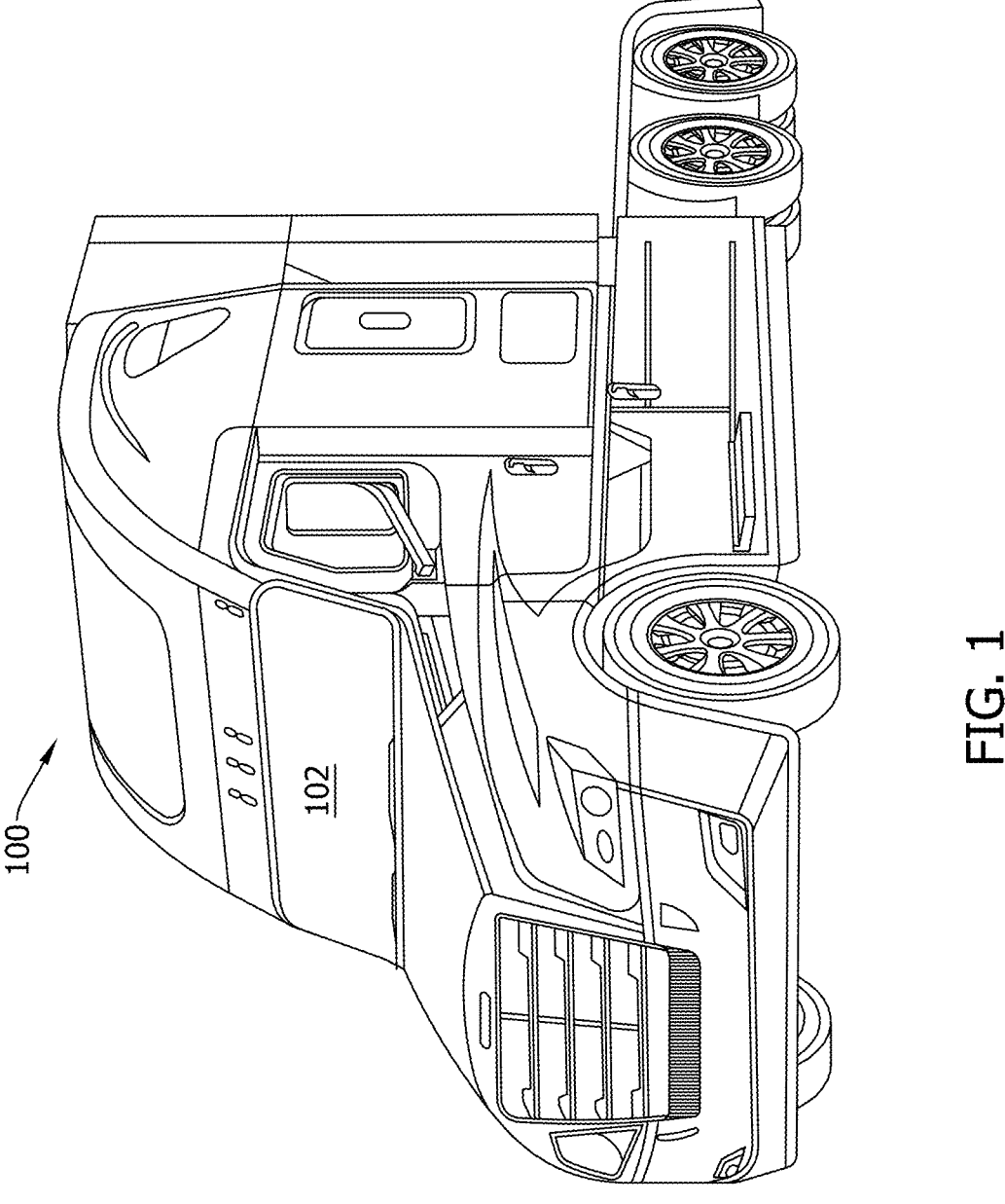
FIG. 1 is a diagram of an autonomous vehicle.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed emergency report system for autonomous vehicles extends current existing systems for occupants to nearby roadway users in case there is no vehicle driver involved in a life-threatening situation. The disclosed emergency report system may instill a sense of security for vehicles that share the roadway with autonomous vehicles.

FIG. 1 is a diagram of an example embodiment of an autonomous vehicle 100. An autonomous vehicle 100 may have a driver or a passenger in a cab 102 of the autonomous vehicle 100. In certain embodiments, these vehicle occupants may take control of the vehicle and drive it manually. In alternative embodiments, cab 102 may be omitted.

Figure 2:
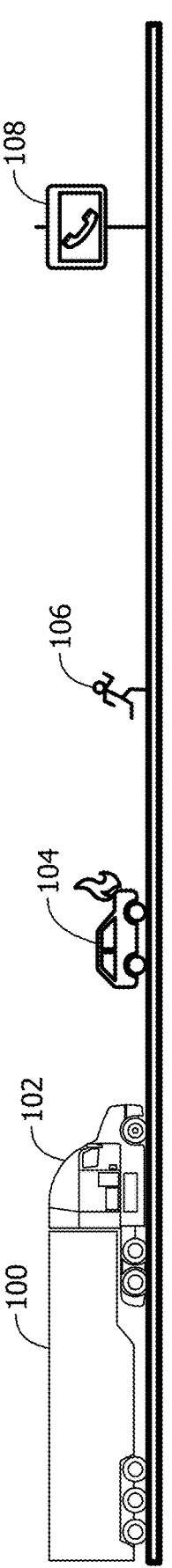
FIG. 2 is a diagram of the autonomous vehicle shown in FIG. 1 near an emergency and a nearby individual running to a call point.

FIG. 2 is a diagram of an autonomous vehicle 100 near a vehicle s104 and a nearby individual 106 running to a call point 108. In the event of an accident, danger, or a life-threatening situation involving or near an autonomous vehicle operated without a driver or occupants, a nearby individual typically uses a cellular phone or an emergency call point along the roadway to make an emergency call for assistance. One disadvantage of relying on a communication device in an emergency system is that the communication device could fail or may not be accessible to an individual or nearby individuals because of poor cellular service in the area, or the battery may not be charged. Likewise, a nearest emergency call point could be located far away from the emergency.

Current emergency reports use combinations of wired phones, cellular phones, internally mounted button or cord, and call boxes to notify personnel of an emergency event. Many of these systems only consider or focus on vehicle occupants and not nearby individuals that do not have access to a cab 102 of an autonomous vehicle 100 to press an internal emergency button or pull a cord. Also, future autonomous vehicles may omit a cab 102. In addition, if a vehicle 104 is experiencing an emergency there is no guarantee that the individual 106 along the roadway will make an emergency call using call point 108 and may just ignore the emergency.

The disclosed emergency report system for nearby individuals may increase the likelihood that someone will make a timely report to request assistance, which may instill a sense of security for everyone that shares the road with autonomous vehicles, such as autonomous vehicle 100.

Figure 3:
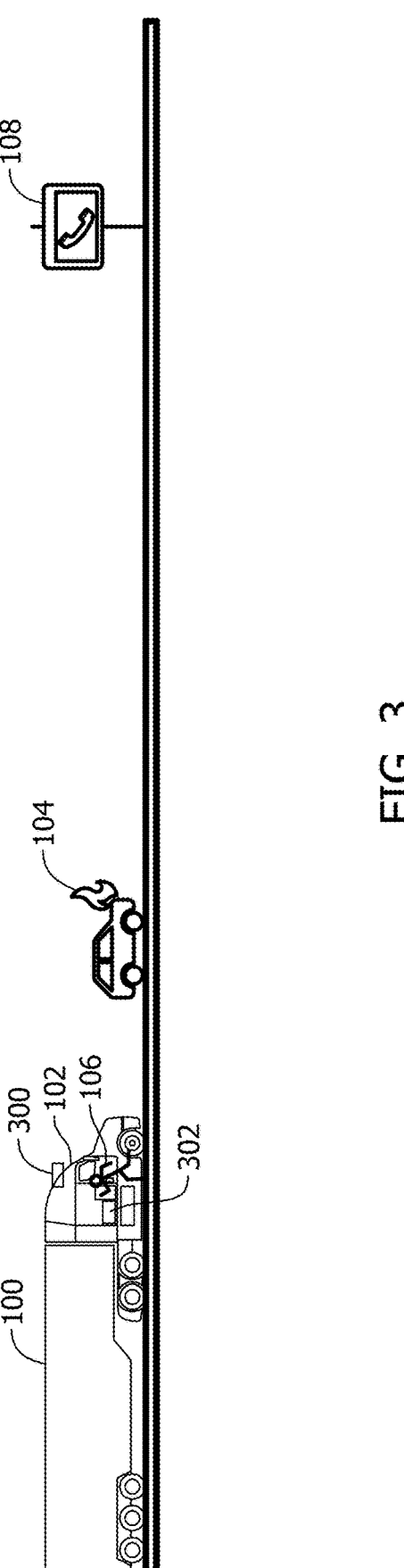
FIG. 3 is a diagram of the autonomous vehicle shown in FIG. 1 near an emergency and a nearby individual running to the vehicle to activate an emergency report system.

FIG. 3 is a diagram of an example autonomous vehicle 100 near an emergency and nearby individual 106 running to the autonomous vehicle 100 to activate an emergency report system 300 onboard autonomous vehicle 100. The emergency report system 300 is located at the autonomous vehicle 100 and is easily accessible for nearby individual 106. The emergency report system 300 may include a protective cover (made of any material configured to protect electrical devices from the environment) for a user interface having, for example, an emergency button (or switch or other actuator), a microphone, a speaker, and an optional camera (shown in FIG. 4). Rather than relying on an available or nearby emergency call point 108, the emergency report system 300 is at the autonomous vehicle 100. In addition to the emergency report system 300, the autonomous vehicle 100 also includes at least one sensor 302 employed to perceive nearby individual 106 or vehicle 104.

Figure 4:
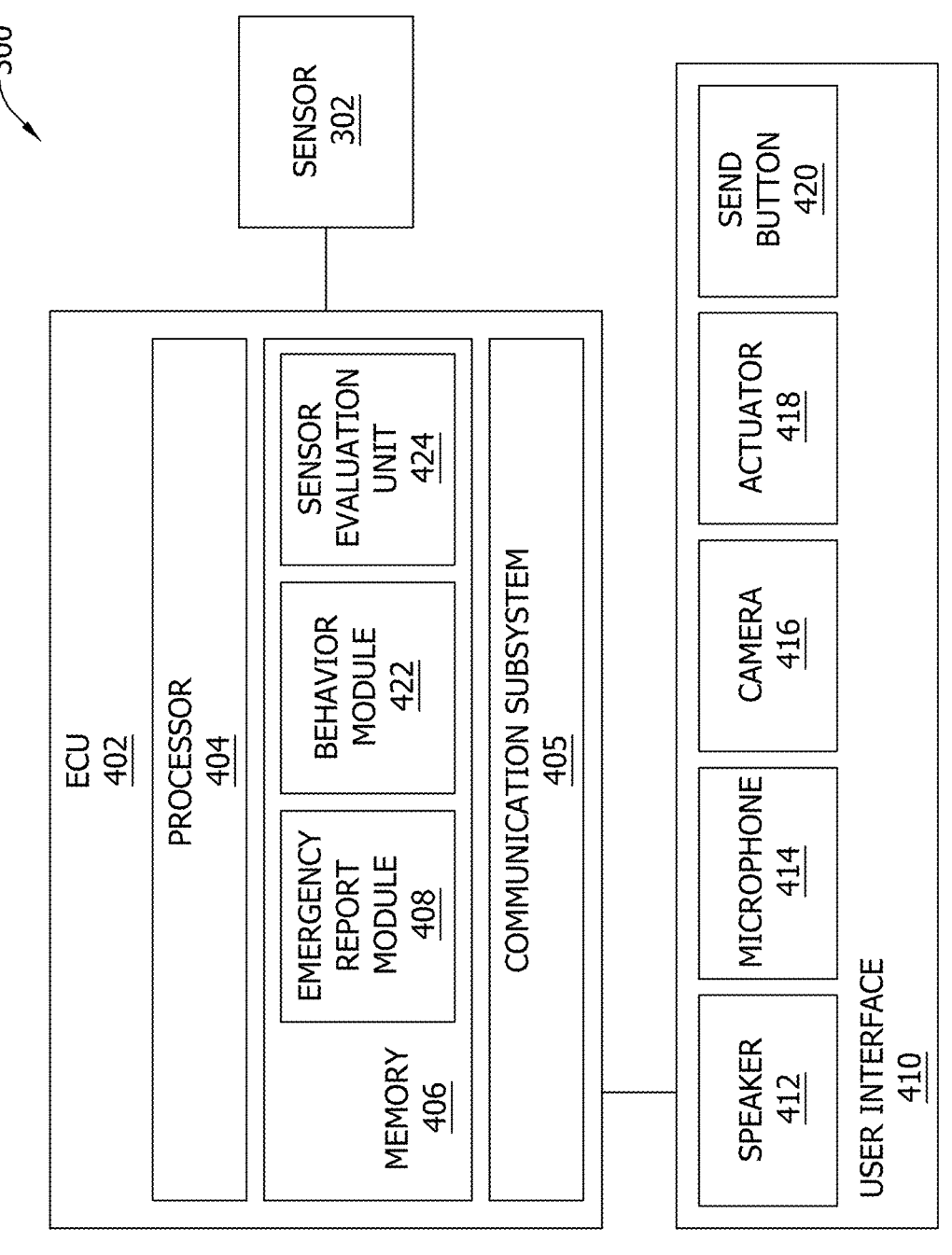
FIG. 4 is a block diagram of an example embodiment of an emergency report system.

FIG. 4 is a block diagram of an example embodiment of emergency report system 300 shown in FIG. 3 onboard autonomous vehicle 100. Emergency report system 300 includes an electronic control unit 402 having at least one processor 404, a communication subsystem 405, and at least one memory 406. Memory 406 is configured to store computer executable instructions, or program code, including at least an emergency report module 408. Communication subsystem 405 includes one or more microprocessors, ASIC, DSP or other suitable processor embedded within ECU 402 for transmitting and receiving data at ECU 402. Communication subsystem 405 may further include hardware or software bus interfaces, network interfaces, interconnects, transceivers, or other functional components for conducting such communications. Communication subsystem 405 is coupled to processor 404 and is configured to receive, store, and transmit data to and from ECU 402 and autonomous vehicle 100. The data includes, for example, a current location, a vehicle condition, or information describing an emergency event. In some embodiments, communication subsystem 405 is configured to receive, store, and transmit data via wireless transmission (e.g., 4G, 5G, or satellite communications). In some embodiments, communication subsystem 405 is configured to send and receive data via another communications device included, for example, on user interface 410 (shown in FIG. 4).

Processor 404 is coupled to memory 406 and is configured to gain access to and execute emergency report module 408. The ECU 402 controls the electrical and computing systems or subsystems in the autonomous vehicle 100, including, for example, sensor 302 and a user interface 410.

ECU 402 controls the emergency report system 300, including user interface 410. User interface 410 may include a speaker 412, a microphone 414, a camera 416, an actuator 418, and a send button 420. User interface 410 enables a user to control various communication-related functions, such as to send or receive a call, send an emergency report, receive a message regarding receipt of the emergency report. User interface 410 may include analog interfaces (e.g., buttons) or may be virtual (e.g., a touchscreen). Speaker 412 and microphone 414 may be internal or external and are configured for audio use during a call using emergency report system 300 and are coupled with a communication module (shown in FIG. 5). Camera 416 is configured for capturing a single image or video stream for the emergency report. In certain embodiments, actuator 418 includes a button configured to be actuated by being pressed or touched by a user. In certain embodiments, the button may comprise a mechanical button such as a push button, slide switch, rotational switch or toggle switch. Alternatively, the button may take the form of a touch sensor such as a capacitive touch sensor that actuates when it senses the touch of user's finger against an exterior surface of the touch sensor. Actuator 418 may be used to initiate a call for assistance. User interface 410 may also include a send button 420 for submitting a report to emergency services.

Figure 5:
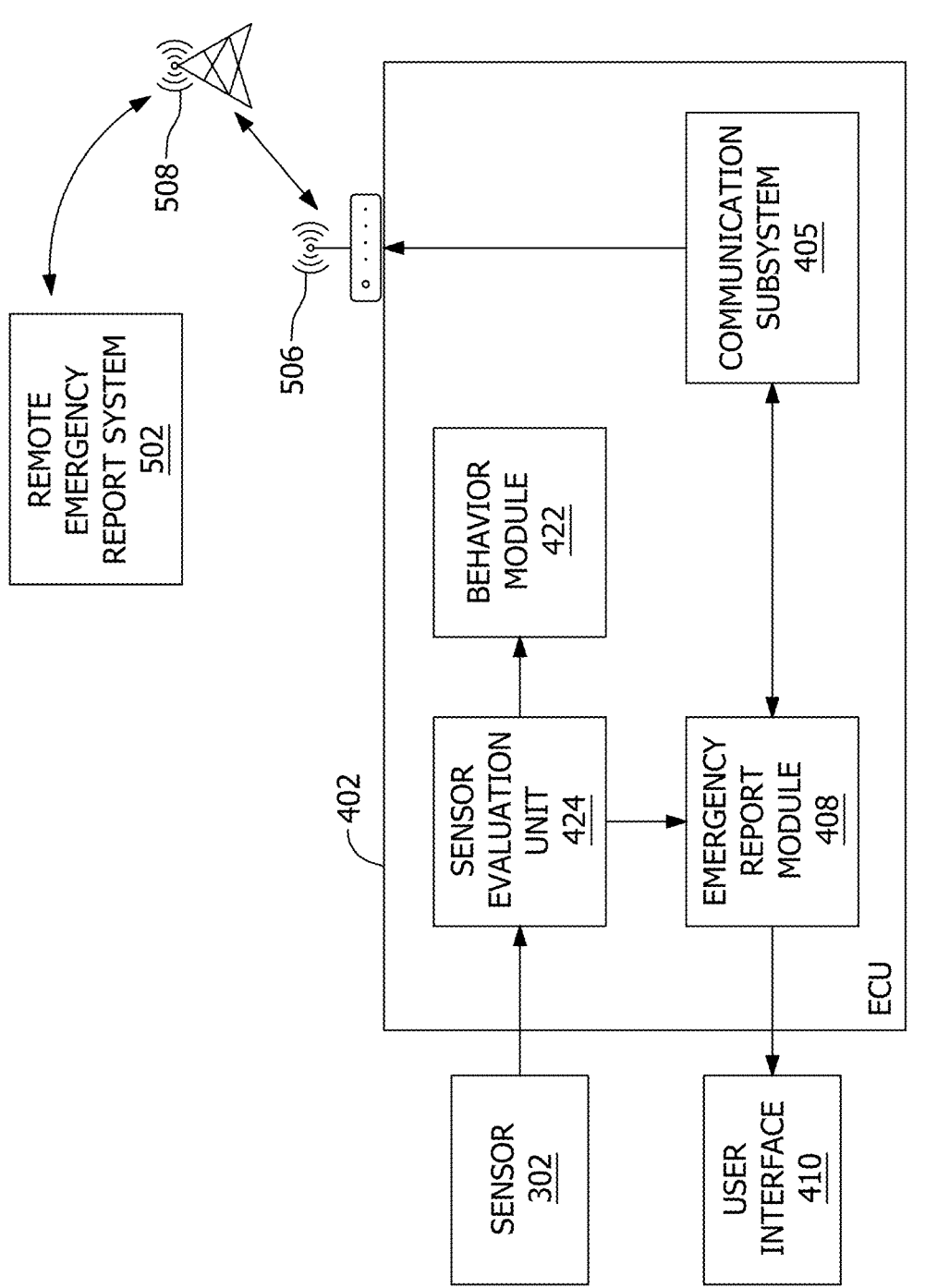
FIG. 5 is a functional block diagram of an example electronic control unit (ECU) for the emergency reporting system shown in FIG. 4.

Memory 406 may be further configured to store program code for one or more additional software modules including, for example, a behavior module 422 and a sensor evaluation unit 424. FIG. 5 is a functional block diagram of ECU 402 for emergency report system 300. FIG. 5 illustrates a data flow for creating and submitting an emergency report to emergency services or to a remote emergency report system 502. Remote emergency report system 502 is a locally based or regionally based system that can collect and distribute emergency reports to appropriate parties, including, for example, vehicle operators, emergency services, municipality representatives, insurance entities, or roadside assistance, among others.

Sensor evaluation unit 424 communicates with one or more sensors 302 for the purpose of detecting, or perceiving, the environment surrounding autonomous vehicle 100. For example, sensor 302 and sensor evaluation unit 424 perceive nearby individual 106 (shown in FIG. 3) and the surrounding situation and detect a potential danger at vehicle 104. Perceiving or detecting individual 106 may include sensing gestures by nearby individual 106, such as, for example, arm waving or other behavior. Perceiving the potential danger may include sensing a human emergency, a vehicle emergency, a weather emergency, or an environmental emergency.

Behavior module 422 communicates with sensor evaluation unit 424. Upon perceiving a potential danger, behavior module 422 is configured to determine whether to perform an emergency stop of the autonomous vehicle 100. Behavior module 422 determines, for example, whether an emergency stop is warranted, is safe to conduct, and in what manner. Behavior module 422 initiates a maneuver to stop or maintain a stop position of the autonomous vehicle 100 so that a nearby individual can initiate an emergency report. When the determination is made to perform the emergency stop of the autonomous vehicle 100, e.g., when the perceived situation indicates an emergency situation, an emergency stop mode activation signal is transmitted by ECU 402 to a planning and control computing system, which may be embodied in another ECU or another autonomy computing system. The transmitted emergency stop mode activation signal initiates maneuvering the autonomous vehicle 100 to a stop or maintains a stop.

ECU 402 includes emergency report module 408 that is configured to communicatively couple to remote emergency report system 502 through communication subsystem 405. Communication subsystem 405 is configured to transmit emergency reports and send and receive audio and/or video data, for example, through a wireless transceiver 506 and over a wireless network 508. Emergency report module 408, user interface 410, and communication subsystem 405 enable nearby individual 106 to initiate an emergency report and conduct an emergency call to one or more emergency services. The data for the emergency report can include information about the autonomous vehicle 100 and information related to the emergency situation. The emergency services or remote emergency report system 502 may send a response message that is received by the communications subsystem 405. The response message may include, for example, a notification of receipt of the emergency report by the remote emergency report system 314.

Figure 6:
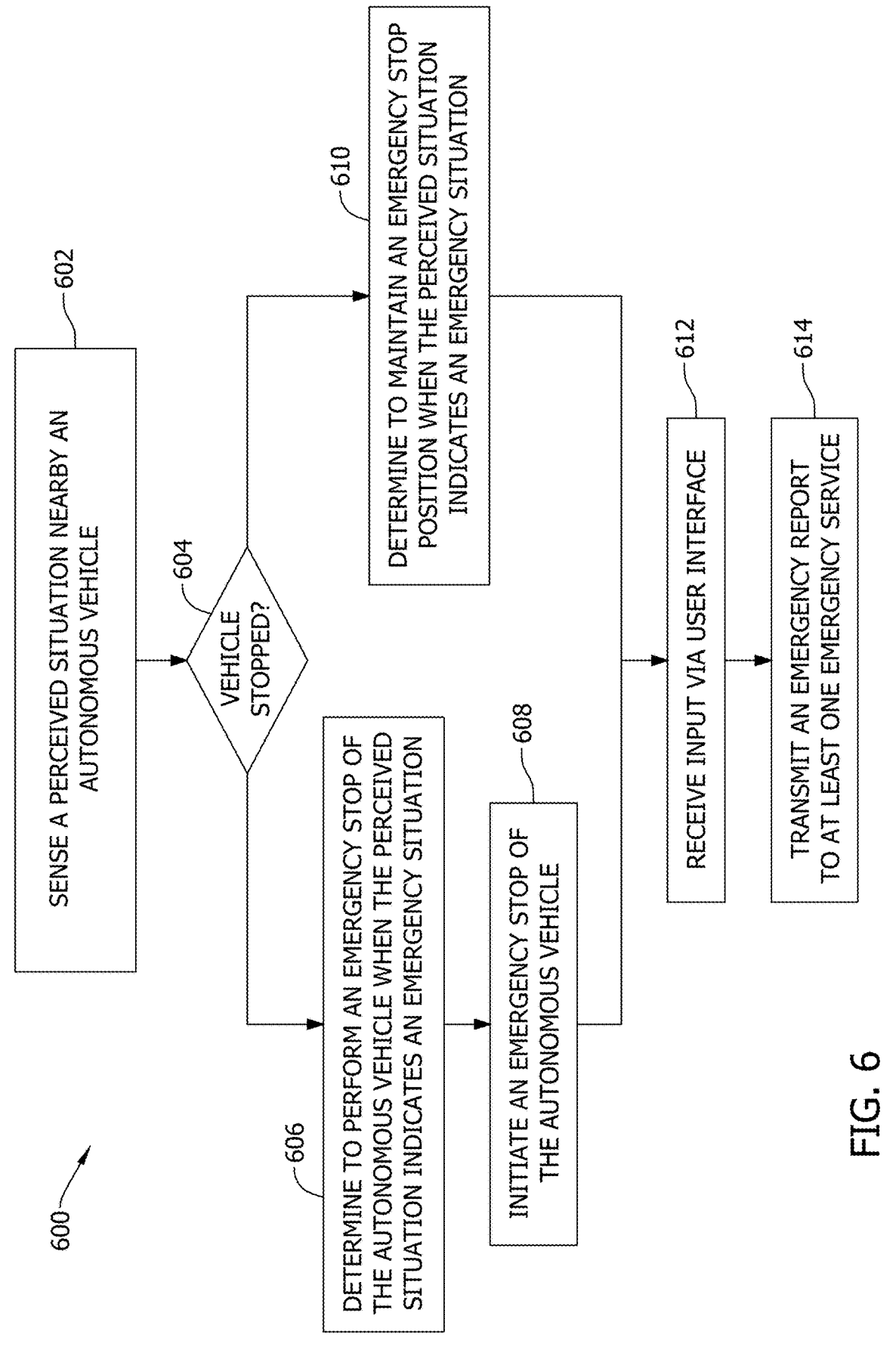
FIG. 6 is a flow diagram of an example method for reporting an emergency on a roadway.

FIG. 6 is a flow diagram of a method 600 for reporting an emergency on a roadway. Method 600 may be embodied in, for example, emergency report system 300 shown in FIG. 4. Method 600 is described below with reference to FIGS. 4-6. ECU 402 executes emergency report module 408 to control and operate emergency report system 300, as well as electronic and computing systems aboard autonomous vehicle 100, including sensor 302. Sensor 302 and sensor evaluation unit 424 sense 602 a perceived situation nearby autonomous vehicle 100.

In executing emergency report module 408, ECU 402 determines 604 whether autonomous vehicle 100 is stopped. If not, ECU 402 determines 606 to perform an emergency stop of autonomous vehicle 100 when the perceived situation indicates an emergency situation. ECU 402 then initiates 608 an emergency stop of autonomous vehicle 100, e.g., a maneuver to safely stop autonomous vehicle 100 off the roadway. If ECU 402 determines 604 autonomous vehicle 100 is already stopped, then ECU 402 determines 610 to maintain an emergency stop position when the perceived situation indicates an emergency situation.

Once stopped, i.e., in an emergency stop, data relating to the emergency situation is collected from one or more sensors 302 and may also be received 612 from a user through user interface 410 to initiate creation of an emergency report. Additionally, the user may initiate an emergency call to one or more emergency services using user interface 410. The emergency report is then transmitted 614 to at least one emergency service. The emergency report may include, for example, autonomous vehicle information and emergency situation information.

An example technical effect of the methods, systems, and apparatus described herein includes at least one of: (a) quick response when an emergency call button is located outside of an autonomous vehicle (with or without an occupant) may allow pedestrians or nearby individuals to quickly summon help in case of an emergency or if the autonomous vehicle is not able or is not aware of a life-threatening situation or that a danger has arisen; (b) visibility and accessibility of a prominently displayed emergency call button located outside of an autonomous vehicle can be easily located and activate when an individual, group, or other vehicle is in trouble may increase the likelihood of timely assistance; (c) enhanced safety when an emergency report system is present may instill a sense of security of the public, autonomous vehicle occupants, and nearby individuals and can assure that help can be summoned quickly in case of an emergency; (d) independence from communication devices when there is no autonomous vehicle occupant or nearby individuals with a communication device (or the device fails or is inaccessible) since an external emergency call button may provide a direct connection to emergency services which is advantageous in life-threatening situations or when danger arises; or (e) applicable in various emergency scenarios since the capabilities of an emergency call button outside an autonomous vehicle can be useful in for example, accidents, medical emergencies, threats, robberies, and fires if there is no driver who can help or make an emergency call.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A method for reporting an emergency on a roadway, the method comprising:

sensing, by an electronic control unit (ECU) of an autonomous vehicle, a perceived situation nearby the autonomous vehicle, wherein the perceived situation includes sensed gestures by a nearby individual including arm waving;

determining, by the ECU, to perform an emergency stop of the autonomous vehicle when the perceived situation indicates an emergency situation;

initiating an emergency stop of the autonomous vehicle; and transmitting, by the ECU, an emergency report to at least one emergency service, the emergency report including autonomous vehicle information and emergency situation information.

2. The method of claim 1, wherein sensing the perceived situation includes sensing a human emergency, a vehicle emergency, a weather emergency, or an environmental emergency.

3. The method of claim 1, wherein transmitting the emergency report is in response to the nearby individual making an emergency call through a communication module of the ECU.

4. The method of claim 1, further comprising indicating, through a user interface coupled with the ECU, receipt of the emergency report by a remote emergency report system in communication with the autonomous vehicle.

5. The method of claim 4, wherein the user interface includes at least one of a microphone, a speaker, or a camera.

6. An emergency report system for an autonomous vehicle, the emergency report system comprising:

an electronic control unit (ECU) comprising a memory storing executable instructions and at least one processor coupled to the memory and configured to gain access to and execute the executable instructions, the at least one processor programmed to:

employ at least one sensor to sense a perceived situation nearby the autonomous vehicle, wherein the perceived situation includes sensed gestures by a nearby individual including arm waving;

determine to perform an emergency stop of the autonomous vehicle when the perceived situation indicates an emergency situation;

initiate the emergency stop; and transmit an emergency report to at least one emergency service, the emergency report including autonomous vehicle information and emergency situation information.

7. The system of claim 6, wherein the detected emergency situation includes at least one of a human emergency, a vehicle emergency, a weather emergency, or an environmental emergency.

8. The system of claim 6, wherein the at least one processor programmed to initiate maneuvering the autonomous vehicle to a stop.

9. The system of claim 6, wherein the at least one processor programmed to initiate maneuvering the autonomous vehicle to maintain a stop.

10. The system of claim 6, wherein the emergency report includes information received from a remote emergency report system coupled to the autonomous vehicle, the information at least partially provided by a nearby individual.

11. The system of claim 6, wherein the at least one processor is configured to indicate, through a user interface coupled with the ECU, receipt of the emergency report by a remote emergency report system in communication with the autonomous vehicle.

12. An autonomous vehicle comprising:

a user interface; and an electronic control unit (ECU) comprising a memory storing executable instructions and at least one processor coupled to the memory and configured to gain access to and execute the executable instructions, the at least one processor programmed to:

employ at least one sensor to sense a perceived situation nearby the autonomous vehicle, wherein the perceived situation includes sensed gestures by a nearby individual including arm waving;

determine to perform an emergency stop of the autonomous vehicle when the perceived situation indicates an emergency situation;

initiate the emergency stop; and transmit an emergency report to at least one emergency service through a remote emergency report system, the emergency report including autonomous vehicle information and emergency situation information.

13. The autonomous vehicle of claim 12, further comprising an actuator coupled to the user interface for transmitting a communications mode activation signal to one or more emergency services.

14. The autonomous vehicle of claim 13, further comprising an actuator cover for protecting the actuator.

15. The autonomous vehicle of claim 12, wherein the user interface includes at least one of a microphone, a speaker, or a camera.

16. The autonomous vehicle of claim 15, wherein the at least one processor is configured to enable a nearby individual to complete an emergency call.

17. The autonomous vehicle of claim 12 further comprising a camera coupled to the autonomous vehicle and communicatively coupled to the ECU.

18. The autonomous vehicle of claim 12, wherein the at least one processor is configured to communicate over at least one wireless channel with the at least one emergency service.

* * * * *